Feb. 23, 1943.   D. P. JACOBUS   2,312,250
BEARING MEANS
Filed Aug. 22, 1941

INVENTOR.
DALE P. JACOBUS
BY Paul L. Kohler
ATTORNEY.

Patented Feb. 23, 1943

2,312,250

UNITED STATES PATENT OFFICE 2,312,250

BEARING MEANS

Dale P. Jacobus, St. Johnsbury, Vt., assignor to Fairbanks, Morse & Co., Chicago, Ill., a corporation of Illinois Application August 22, 1941, Serial No. 407,876

3 Claims. (Cl. 308—2)

This invention relates to an improved bearing structure of a character suitable to the pivotal support of knife-edge pivots and the like, and wherein the bearing is capable of self-adjustment in the application of a knife-edge pivot thereto, for the attainment of a true line-contact seating of the knife-edge pivot in the bearing. More particularly, the invention contemplates certain improvements in a bearing of the type indicated, of a nature to increase the effectiveness and accuracy of its bearing function.

While the improved bearing is suitable for use in any structural assembly requiring such a bearing, it has particular utility in connection with weighing scales, wherein accuracy in the pivotal mounting of operative elements in the weighing mechanism, is of prime importance. Accordingly, in the illustrated embodiment, the invention is shown as applied in conjunction with a beam or lever of a weighing scale, the bearing being mounted on the upper end of the beam stand and cooperating with the knife-edge pivot to retain the pivot in true line-contact therewith.

The presently improved bearing is similar in general structure to the bearing disclosed and claimed in an application by Harlan A. Hadley, for Bearing structures, filed November 27, 1939, and bearing Serial No. 306,283 (this application being now issued as Patent No. 2,256,318, dated September 16, 1941), and presents an improvement thereover in respect to certain cooperating parts of the bearing. In the bearing assembly as shown in said application, a pair of bearing elements are formed and arranged to have a substantial planar surface engagement, with one element pivotally movable over the planar surface of the other, about a pivot member or pin upstanding from the central zone of said surface. The pivot pin is mounted by inserting the same in a drilled aperture or hole in one element and the other element is similarly apertured to receive the upstanding free end of the pin, so that the latter element is thereby adapted for pivotal movement about the pin as an axis. It has been found in practice that in forming the pin apertures in said elements, the exposed margins of the apertures are frequently burred or roughened in the drilling operations. Unless all such burrs are removed and the rough margins smoothed before assembly of the bearing parts, the surface contact between the elements will be adversely affected, such that the desired close frictional engagement of the elements and smooth pivotal movement of one over the planar surface of the other, will not obtain. The result is an inaccurate functioning of the bearing, as will be appreciated.

The principal object of the present invention, therefore, is to provide in a bearing of the character indicated, an improved bearing structure which will fully overcome the foregoing disadvantage, and which will greatly improve the effectiveness and accuracy of its bearing function. To this end, the lower bearing element of the assembly is provided with a planar bearing seat for the adjacent upper element, so formed as to provide a recess in the zone of the pivot pin and extending appreciably below the plane of the seat.

Further objects and advantages attained by the invention will appear readily from the following description of a preferred embodiment thereof, as illustrated in the accompanying drawing, in which.

Figure 1:
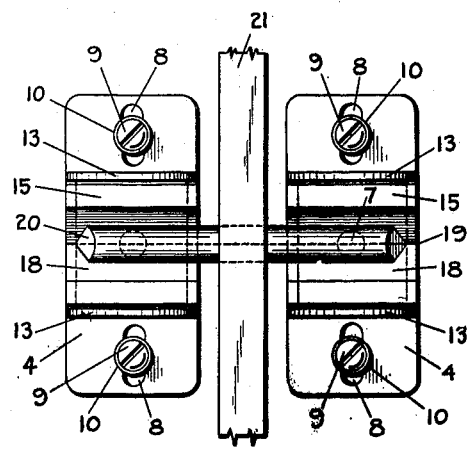
Fig. 1 is a top or plan view of a scale beam mounting arrangement, showing a knife-edge pivot for the beam pivotally journalled upon bearings constructed according to the present invention.

Referring to the drawing by suitable characters of reference, the numeral 1 designates generally, a frame member which may be a part of the frame of a weighing scale assembly, the frame member providing spaced, flat-topped head portions 2, each provided with tapped holes 3. On the flat top surface of each head 2 is positioned a plate-like member 4 which forms the base of the improved bearing assembly of this invention. The central portion of the member 4 is provided with a raised annular ring 5 preferably integral therewith as shown, and the surface thereof is preferably machined to provide a smooth and flat bearing surface 6 serving as a seat for another element of the bearing assembly later to be described. The plate 4 is apertured centrally of the raised ring 5, for the reception of a pivot pin 7 which is suitably secured therein and which projects above the surface of the raised ring 5. As will be now observed, the raised, annular ring 5 defines a pocket or recess 5a extending below the bearing surface 6 and about the pin 7, the depth of this recess and its radial extent being made fully sufficient to assure that any burrs remaining on the upper margin 7a of the pin aperture in plate 4, or any projecting roughness of this margin, will be confined to the recess and well below the ring surface 6. Thus an accurate seating of an upper bearing element presently to be described, on the ring surface 6, and smooth pivotal movement of the element over said surface, are thereby assured, since the burrs and roughness in the zone of the pin aperture being confined to the said recess, cannot interfere with the proper bearing engagement of the upper element on the ring 5.

Adjustable securement of the plate member 4 upon the head 2 may be effected in the manner indicated, as by end slots 8 in the plate and suitable screws 9 and lock washers 10, the screws projecting through the slots and threadedly seating in the tapped apertures 3 in the head 2. As appears in Fig. 1 in particular, the plate slots 8 are directed longitudinally of the plate, to provide for adjustable positioning of the latter, longitudinally of the head 2.

Figure 4:
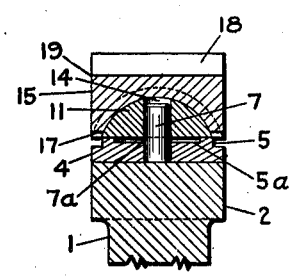
Fig. 4 is a sectional view of the bearing assembly and support as taken on the line 4—4 of Fig. 3.

According to the present exemplary disclosure, the upper bearing element hereinbefore referred to, comprises a saddle block 11 formed with a curved or rounded upper surface 12, and provided with shoulders 13 at the ends of the curved surface. The under surface is planar and preferably machined for seating upon the surface 6 of ring 5 on plate 4, while a circular opening 14 extending through the center portion of the saddle block, is adapted to receive the projecting pin 7 mounted in the bearing plate 4. The pin 7 is of such length relative to the depth of the saddle block in the zone of the opening 14, that it terminates inwardly of the upper open end of the opening 14, as can be seen in Fig. 4, thereby preventing projection of any part of the pin above the surface 12. The opening 14 is of such diameter as to allow the saddle block 11 to pivot smoothly about the pin 7, thereby adapting the saddle block for movement in a manner to compensate for longitudinal misalignment of the pivots, as will readily appear from the drawing.

From the foregoing description of the saddle block 11 and its pivotal seating on the surface 6 of ring 5, it will appear now that as in the case of the pin aperture in plate 4, any burrs remaining on the margin at the lower end of the pin aperture or opening 14, or any roughening of this margin, will be accommodated in the ring recess 5a. Accordingly, there is thus obviated any interference with the proper and accurate engagement of the bearing elements in the zone of the ring seat 6.

Figure 3:
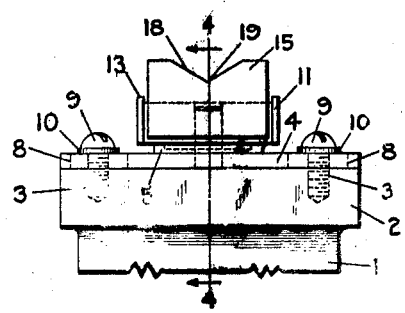
Fig. 3 is a side elevation taken on line 3—3 of Fig. 2, showing the assembled bearing as mounted on a support therefor.
Figure 5:
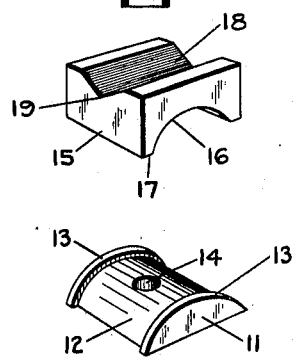
Figs. 5, 6 and 7 are perspective views of the bearing block, saddle block, and bearing base or seat respectively, illustrating the structural details of each.
Figure 6:
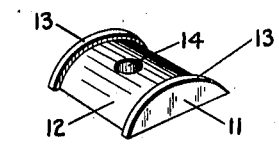
Figure 7:
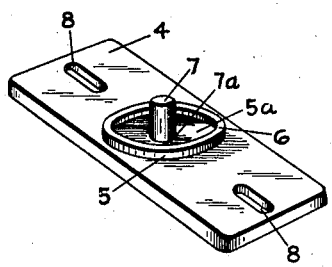

Completing the bearing assembly is a bearing block 15 which is adapted for seating upon the curved surface 12 of the saddle block 11, as by the provision of an inwardly curved groove or depression 16 in the lower or under side of the bearing block, the curvature of which conforms to that of the surface 12. The arcuate extent of groove 16 is less than that of surface 12, so that the bearing block may rock upon the saddle block, such rocking displacement of the bearing block being limited in any suitable manner, as in the present example, by abutment of the end portions 17 thereof, with adjacent portions of the base 4 (Fig. 4) outwardly of the ring 5. Such provision for rocking movement of the bearing block relative to the saddle block, enables self-adjustment of the bearing block to compensate for horizontal misalignment in the pivotal assembly, as when the knife-edge pivot to be pivotally supported by the bearing, is displaced so that its axis is not horizontal. The shoulders 13 of the saddle block serve to retain the bearing block 15 in position on the saddle block, but as will appear in Fig. 3, the extent of the bearing block between the shoulders is such as to provide for a small clearance therebetween, to permit some slight displacement of the bearing block relative to the shoulders, apart from its rocking movement, as a further misalignment compensating feature. The upper portion of the bearing block 15 is cut-away, to form a central V-shaped depression 18, the apex 19 of which provides a knife-edge bearing seat for a knife-edge pivot element 20, the latter carried by and forming a pivotal support for a scale beam or lever 21. As appears in the drawing, the knife-edge bearing seat extends at a right angle to the axis of the curved under surface of the bearing block, for an obvious reason.

Figure 2:
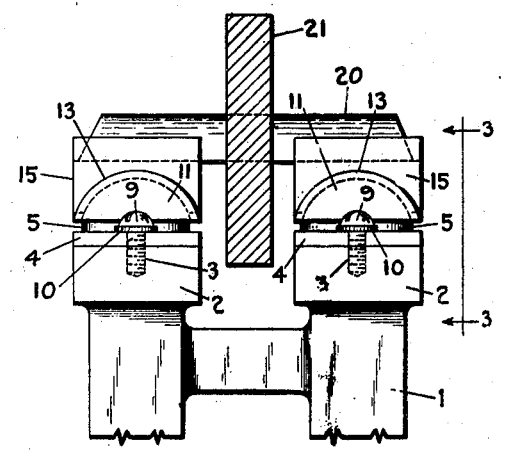
Fig. 2 is an end elevation of the arrangement shown by Fig. 1.

In the assembly showing of Figs. 1 and 2, the bearing structures on the frame heads 2, are secured thereto in relatively adjusted positions such that the knife-edge seats in the bearing blocks are in axial alignment, this being readily effected through the screw and slot arrangement 8—9 permitting such adjustment. Thereafter, the beam 21 and its knife-edge pivot 20 may be mounted, with the pivot spanning the two bearings and pivotally seating in the knife-edge seats of the latter. The provision for rocking movement of the bearing block 15 on the saddle element 11, and for pivotal movement of both as a unit, about the pin 7 as a vertical axis, fully adapts the bearing structures for self-adjustment relative to the beam pivot 20, to effect a true-line-contact of the pivot knife-edge with the knife-edge bearing seats of the bearings.

While it is preferred to form elements 4 and 11 of the bearing assembly from suitable metallic stock, the bearing block 15 may be formed from either metallic or non-metallic material, subject primarily to the condition that whatever material is selected, it must be characterized by a wear-hardness to withstand wear resulting from the knife-edge contact thereof with the pivot 20. This last condition obtains in particular, in knife-edge pivoting of beams in weighing scales and like precision instruments.

It will be readily seen that I have disclosed in a bearing structure which is fully capable of self-adjustment in assembly, in a manner to insure a line-to-line engagement of the bearings with the knife-edge pivot, a provision for assuring an effective and accurate seating of one element upon another as respects in particular, the lower elements of the assembly. This provision serving the purpose disclosed, aids materially in the manufacture of the bearing assembly by eliminating any necessity for additional operations on the elements to remove burrs and roughness on the margins of the pin apertures therein, and further it definitely assures the desired accuracy of bearing function by precluding interference from the source described, with the proper seating of the block 11 on the ring surface 6 and its smooth pivotal movement thereover.

I claim:

1. In a bearing assembly of the character described, a base providing a planar bearing seat, said seat being recessed below the surface thereof, a member mounted on said seat and overlying said recess, for pivotal movement thereon about a vertical axis through said recess, and a bearing element, said member being formed to provide a mounting seat for said bearing element, adapted for permitting rocking movement of the latter thereon about a horizontal axis, said base cooperating with said bearing element in limiting rocking movement thereof.

2. In a bearing assembly of the character described, a base providing a substantially annular raised seat having a planar bearing surface, a pivot element upstanding on said base centrally of said annular portion and projecting vertically above said bearing surface, a member seating on said bearing surface and being centrally apertured to receive said pivot element, whereby said member is pivotally movable on said surface about said pivot element as an axis, and a bearing element supported by said member for movement thereon about a horizontal axis.

3. In combination with a support and lever provided with a pivot element, a bearing base adjustably secured upon the support, said base having a substantially planar bearing seat, said seat being centrally recessed below the surface thereof, a member arranged on said bearing seat and overlying said recess, for pivotal movement thereon about a vertical axis centrally of said recess, said member being formed to provide an arcuate seat, and a bearing element received on said arcuate seat and adapted for rocking displacement thereon, said element providing a pivotal support for said lever pivot element.

DALE P. JACOBUS.